United States Patent
Hwang et al.

(10) Patent No.: US 12,546,489 B2
(45) Date of Patent: Feb. 10, 2026

(54) AIR CONDITIONER HAVING HUMIDIFIER

(71) Applicant: LG ELECTRONICS INC., Seoul (KR)

(72) Inventors: Bonchang Hwang, Seoul (KR); Beomsoo Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1216 days.

(21) Appl. No.: 16/979,648

(22) PCT Filed: Aug. 31, 2018

(86) PCT No.: PCT/KR2018/010131
§ 371 (c)(1),
(2) Date: Sep. 10, 2020

(87) PCT Pub. No.: WO2019/177213
PCT Pub. Date: Sep. 19, 2019

(65) Prior Publication Data
US 2021/0025603 A1    Jan. 28, 2021

(30) Foreign Application Priority Data
Mar. 13, 2018  (KR) .................. 10-2018-0029183

(51) Int. Cl.
*B05B 17/06*     (2006.01)
*F24F 1/0047*    (2019.01)
(Continued)

(52) U.S. Cl.
CPC ................ *F24F 3/14* (2013.01); *B05B 17/06* (2013.01); *B05B 17/0607* (2013.01);
(Continued)

(58) Field of Classification Search
CPC ........ F24F 3/16; F24F 3/14; F24F 6/12; F24F 8/22; F24F 1/0047; F24F 1/10087; F24F 2006/008; B05B 17/06; B05B 17/0607
(Continued)

(56) References Cited

U.S. PATENT DOCUMENTS 2,525,342 A    10/1950  Frie
4,612,777 A *   9/1986  Noma .................. A47F 3/0447
                                                    261/118
(Continued)

FOREIGN PATENT DOCUMENTS

CN        2087512        10/1991
JP       61285330 A *     6/1985
(Continued)

OTHER PUBLICATIONS

English translation of JP2017125652 (Year: 2017).*
(Continued)

*Primary Examiner* — John F Pettitt, III
(74) *Attorney, Agent, or Firm* — KED & ASSOCIATES

(57) ABSTRACT

A ceiling type air conditioner includes a casing, a panel having a discharge hole and a suction hole, and a humidifying unit provided between the casing and the panel, the humidifying unit comprising a humidifying body in which humidifying water is contained. The humidifying body includes a bottom surface in which a humidifying suction hole corresponding to the suction hole and a humidifying discharge hole corresponding to the discharge hole are defined, an outer surface extending upward from an edge of the bottom surface, a suction-side surface extending upward from an edge of the humidifying suction hole, and a discharge-side surface extending upward from an edge of the humidifying discharge hole.

8 Claims, 8 Drawing Sheets

(51) Int. Cl.
*F24F 3/14* (2006.01)
*F24F 3/16* (2021.01)
*F24F 6/12* (2006.01)
*F24F 6/00* (2006.01)
*F24F 8/22* (2021.01)

(52) U.S. Cl.
CPC ........ B05B 17/0615 (2013.01); F24F 1/0047 (2019.02); F24F 3/16 (2013.01); F24F 6/12 (2013.01); *F24F 2006/008* (2013.01); *F24F 8/22* (2021.01)

(58) Field of Classification Search
USPC .................................................. 261/DIG. 48
See application file for complete search history.

(56) References Cited

U.S. PATENT DOCUMENTS

| | | | | |
|---|---|---|---|---|
| 2008/0110192 A1* | 5/2008 | Yun | ........................ | F24F 1/0087 62/304 |
| 2015/0330643 A1 | 11/2015 | Lee et al. | | |
| 2016/0047563 A1* | 2/2016 | Kim | ........................ | G01F 23/263 62/125 |
| 2017/0307232 A1* | 10/2017 | Nouchi | .................. | F24F 1/0047 |
| 2018/0172300 A1* | 6/2018 | Conrad | .................. | F24F 1/0087 |

FOREIGN PATENT DOCUMENTS

| | | | | |
|---|---|---|---|---|
| JP | 06-18830 | | 3/1994 | |
| JP | 11-6646 | | 1/1999 | |
| JP | 2003-194385 | | 7/2003 | |
| JP | 2003-254551 | | 9/2003 | |
| JP | 2017125652 A | * | 7/2017 | .............. B05B 5/00 |
| KR | 200418577 Y1 | * | 6/2006 | |
| KR | 10-2015-0130068 | | 11/2015 | |
| WO | WO 02/073095 | | 9/2002 | |

OTHER PUBLICATIONS

English translation of KR-200418577 (Year: 2004).*
International Search Report (with English Translation) and Written Opinion dated Jan. 2, 2019 issued in Application No. PCT/KR2018/010131.
German Office Action dated Dec. 17, 2021.
Chinese Office Action issued in Application No. 201880091082.1 dated Apr. 25, 2021.

* cited by examiner (a)

(b)

(c)

AIR CONDITIONER HAVING HUMIDIFIER

CROSS-REFERENCE TO RELATED PATENT APPLICATIONS

This application is a U.S. National Stage Application under 35 U.S.C. § 371 of PCT Application No. PCT/KR2018/010131, filed Aug. 31, 2018, which claims priority to Korean Patent Application No. 10-2018-0029183, filed Mar. 13, 2018, whose entire disclosures are hereby incorporated by reference.

TECHNICAL FIELD

The present invention relates to a ceiling type air conditioner.

BACKGROUND ART

Air conditioners are apparatuses that maintain air in a predetermined space at a proper state according to use and purpose thereof. In general, such an air conditioner includes a compressor, a condenser, an expansion device, and an evaporator. Thus, the air conditioner has a refrigeration cycle in which compression, condensation, expansion, and evaporation processes of a refrigerant are performed. Thus, the air conditioner may heat or cool the predetermined space.

The predetermined space may be variously provided according to a place at which the air conditioner is used. For example, when the air conditioner is disposed in a home or office, the predetermined space may be an indoor space of a house or building.

When the air conditioner performs a cooling operation, an outdoor heat-exchanger provided in an outdoor unit may serve as a condenser, and an indoor heat-exchanger provided in an indoor unit may serve as an evaporator. On the other hand, when the air conditioner performs a heating operation, the indoor heat-exchanger may serve as the condenser, and the outdoor heat-exchanger may serve as the evaporator.

The air conditioner may be classified into an upright type, a wall-mounted type, or a ceiling type according to its installation position. The upright type air conditioner may be understood as a type of air conditioner which is installed to be erected in an indoor space, and the wall-mounted type air conditioner may be understood as a type of air conditioner which is installed to be attached to a wall surface.

Also, the ceiling type air conditioner may be understood as a type of air conditioner which is installed on a ceiling. For example, the ceiling type air conditioner includes a casing embedded in the ceiling and a panel coupled to a lower portion of the casing and defining a suction hole and a discharge hole.

In relation to such a ceiling type air conditioner, the present applicant has filed and published the following prior art document.

Prior Art Document 1

1. Patent Publication Number: 10-2017-0143318 (Date of Publication: Dec. 29, 2017)
2. Title of The Invention: CEILING TYPE AIR CONDITIONER Here, such a ceiling type air conditioner operates in heating and cooling modes to adjust a temperature of an inner space by discharging hot wind or cold wind. However, there is a problem in that indoor humidity decreases in the process of controlling the temperature of the indoor space. Particularly, when operating in the heating mode, hot and dry air is discharged into the indoor space, and thus, there is a problem that the user feels uncomfortable.

DISCLOSURE OF THE INVENTION

Technical Problem

In order to solve the above problems, an object of this embodiment is to provide a ceiling type air conditioner provided with a humidifying unit that humidifies discharged air.

In addition, an object of this embodiment is to provide a ceiling type air conditioner in which humidifying water is converted into fine particles or droplets, and the fine particles are supplied along a flow of discharged air.

In addition, an object of this embodiment is to provide a ceiling type air conditioner in which a water supply and drain structure is provided in a humidifying unit so that humidifying water is stored only when humidification is required.

Technical Solution

A ceiling type air conditioner according to this embodiment includes a casing, a panel having a discharge hole and a suction hole, and a humidifying unit disposed between the casing and the panel, the humidifying unit comprising a humidifying body in which humidifying water is contained. Here, the humidifying body includes a bottom surface in which a humidifying suction hole corresponding to the suction hole and a humidifying discharge hole corresponding to the discharge hole are defined, an outer surface extending upward from an edge of the bottom surface, a suction-side surface extending upward from an edge of the humidifying suction hole, and a discharge-side surface extending upward from an edge of the humidifying discharge hole.

Also, the humidifying unit may include a vibrator disposed inside the humidifying body to convert the humidifying water into fine particles.

Particularly, at least one humidifying hole through which the fine particles pass may be defined in the discharge-side surface. Therefore, the fine particles may be supplied through the humidifying hole by a flow of discharged air.

Advantageous Effects

In the ceiling type air conditioner according to the present invention, the humidifying unit that humidifies the discharged air may be provided as necessary to comfortably maintain the indoor temperature and the indoor humidification in the indoor space.

Particularly, the humidifying unit may supply the water, which is converted into the fine particles, along the flow of the discharged air, and thus, a separate power device for the humidification may not be required.

In addition, since the water supply and drain structure is provided in the humidifying unit to accommodate the humidifying water only when the humidification is required, the odor due to the contamination of the humidifying water may be prevented from occurring.

MODE FOR CARRYING OUT THE INVENTION

Figure 1:
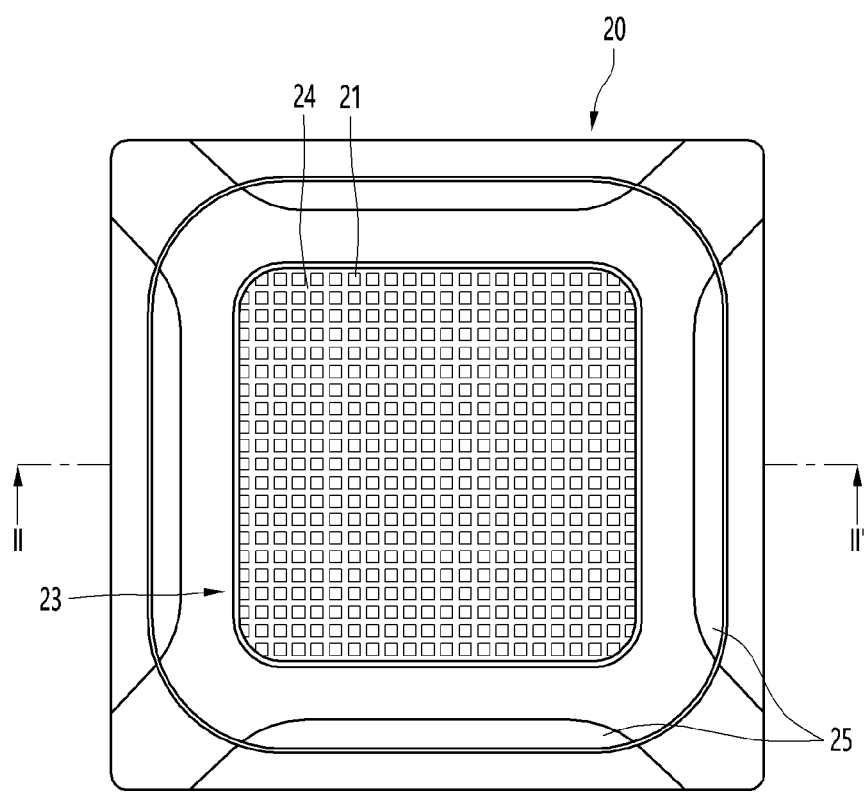
FIG. 1 is a view of a ceiling type air conditioner according to an embodiment of the present invention.

Hereinafter, some embodiments of the present invention will be described in detail with reference to the accompanying drawings. Exemplary embodiments of the present invention will be described below in more detail with reference to the accompanying drawings. It is noted that the same or similar components in the drawings are designated by the same reference numerals as far as possible even if they are shown in different drawings. In the following description of the present invention, a detailed description of known functions and configurations incorporated herein will be omitted to avoid making the subject matter of the present invention unclear.

In the description of the elements of the present invention, the terms first, second, A, B, (a), and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", "coupled" or "joined" to the latter with a third component interposed therebetween.

Figure 2:
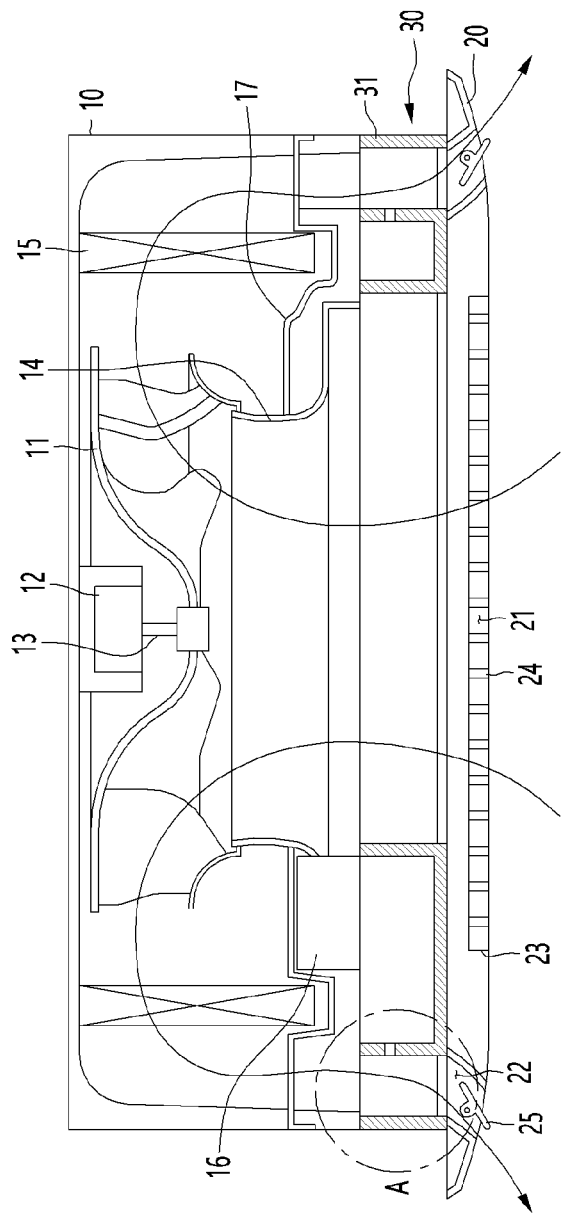
FIG. 2 is a view illustrating a flow of air by cutting the ceiling type air conditioner along line II-II' of FIG. 1.

FIG. 1 is a view of a ceiling type air conditioner according to an embodiment of the present invention, and FIG. 2 is a view illustrating a flow of air by cutting the ceiling type air conditioner along line II-II' of FIG. 1.

Referring to FIGS. 1 and 2, a ceiling type air conditioner (hereinafter, referred to as an air conditioner) according to the spirit of the present invention includes a casing or housing 10 and a panel 20. The casing 10 is embedded in an inner space of a ceiling.

Here, the panel 20 is disposed at approximately a height of the ceiling and may be exposed to the outside. The shape illustrated in FIG. 1 may be understood as an air conditioner exposed on the ceiling.

Also, a plurality of components may be installed inside the casing 10. The plurality of components may include a blowing fan 11 driven to suction and discharge indoor air. A motor shaft 13 of a fan motor 12 may be coupled to the blowing fan 11, and the blowing fan 11 may rotate by driving of the fan motor 12. For example, the blowing fan 11 may include a centrifugal fan.

Referring to FIG. 2, a vertical direction, i.e., a direction in which the motor shaft 13 of the fan motor 12 extends toward the blowing fan 11 may be referred to as an "axial direction", and a direction perpendicular to the axial direction may be referred to as a radial direction.

In addition, the plurality of components may include an orifice or guide tunnel 14 that guides air suctioned toward the blowing fan 11. The orifice 14 is disposed at a suction side of the blowing fan 11 to guide the air suctioned into the casing 10 toward the blowing fan 11.

Also, the plurality of components may include a heat exchanger 15 that is heat-exchanged with the air suctioned into the casing 10. The heat exchanger 15 is disposed to be bent several times along an inner surface of the casing 10 and may be disposed to surround the inside of each of the blowing fan 11 and the orifice 14 in the radial direction.

Also, the plurality of components may include a control unit or controller 16 that controls various components. The control unit 16 may perform various functions such as driving of the blowing fan 11. Also, the control unit 16 may be disposed between the heat exchanger 15 and the orifice 14.

Also, the plurality of components may include a drain pan or tray 17 disposed under the heat exchanger 15. The drain pan 17 may be provided to accommodate or collect condensed water generated during the heat exchange process. Also, the orifice 14 and the control unit 16 may be fixedly installed on the drain pan 17.

A suction hole 21 and a discharge hole 22 are defined in the panel 20.

For example, the panel 20 may have a substantially rectangular shape when viewed from an upper side. The discharge hole 22 may be defined by punching at least a portion of the panel 20 and may be defined in each of positions corresponding to four sides of the panel 20. Also, the discharge hole 22 may be lengthily defined in a length direction of each of the sides of the panel 20.

Also, the panel 20 includes a discharge vane 25 that opens and closes the discharge hole 22. The discharge vane 25 is rotatably installed to open and close the discharge hole 22.

Also, the panel 20 includes a suction grill 23 mounted at a central portion thereof. The suction grill 23 may define an outer appearance of a lower portion of the air conditioner and may have a shape of an approximately quadrangular frame. The suction grill 23 includes a grill body 24 having a lattice shape to define the suction hole 21.

In summary, the suction hole 21 may be defined in the central portion of the panel 20, and the discharge hole 22 may be disposed in each of four directions outside the suction hole 21. In detail, all four discharge holes 22 may be defined outside the suction hole 21 in up, down, left, and right directions.

Since the suction hole 21 and the discharge hole 22 are defined as described above, the air in the indoor space may be suctioned into the casing 10 through the central portion of the panel 20 and thus be conditioned. The conditioned air may be discharged in the four directions outside the panel 20 through the discharge holes 22.

Also, the air conditioner according to the spirit of the present invention includes a humidifying unit or humidifier disposed between the casing 10 and the panel 20. The humidifying unit 30 is provided with a humidifying body or tray 31 that defines an outer appearance thereof. Hereinafter, the casing 10, the panel 20, and the humidifying unit 30 will be described in detail with reference to FIG. 3.

Figure 3:
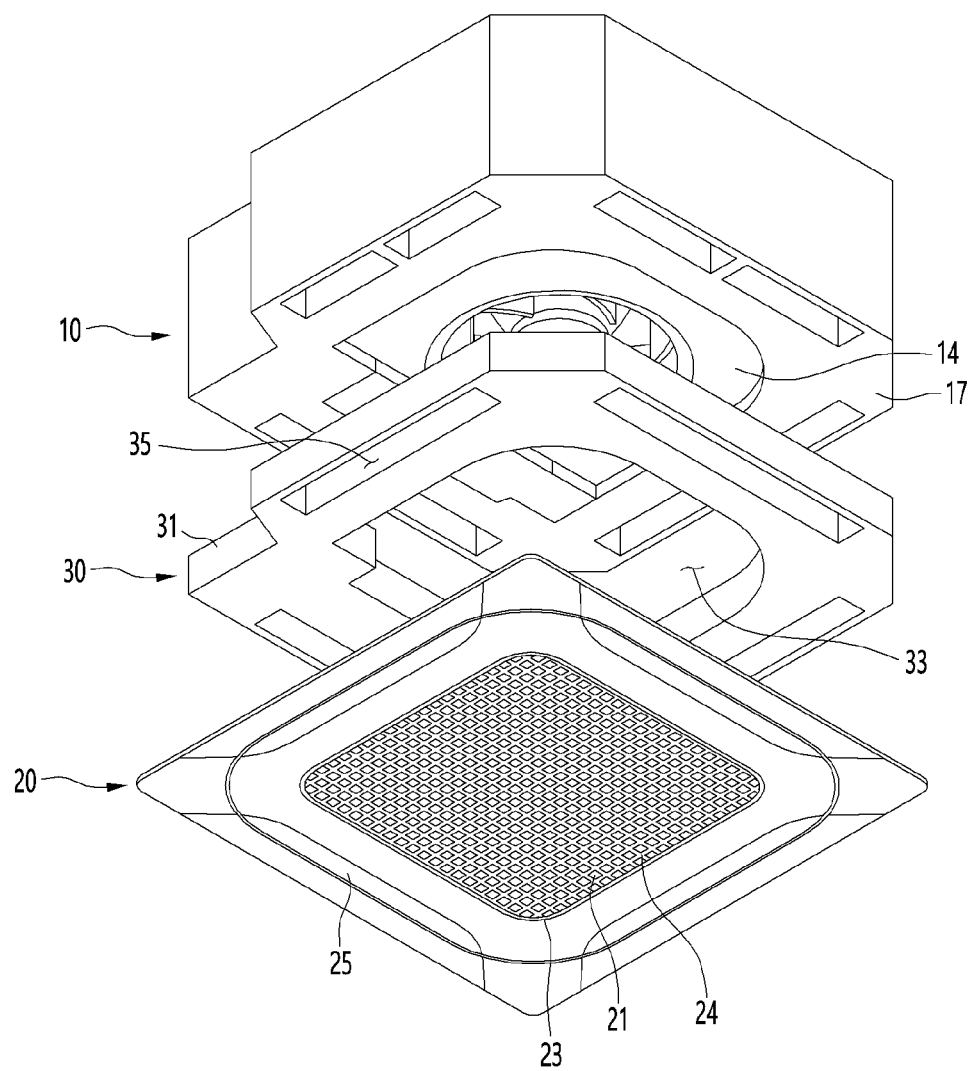
FIG. 3 is a view illustrating a state in which a casing, a humidifying unit, and a panel of the ceiling type air conditioner are separated from each other according to an embodiment of the present invention.

FIG. 3 is a view illustrating a state in which the casing 10, the humidifying unit 30, and the panel 20 of the ceiling type air conditioner are separated from each other according to an embodiment of the present invention. In FIG. 3, for convenience of illustration, an installation structure and a coupling structure are omitted.

As illustrated in FIG. 3, the casing 10, the humidifying unit 20, and the panel 30 are disposed in a state of being stacked with each other in the axial direction. In detail, the humidifying body 31 is coupled to a lower portion of the casing 10, and the panel 20 is coupled to a lower portion of the humidifying body 31. Here, coupling includes both direct coupling and indirect coupling through coupling with other components.

Also, the casing 10, the humidifying body 31, and the panel 20 may be installed to be separable from each other. For example, the panel 20 may be separated to be inspected and replaced. Also, the humidifying body 31 may be separated to inspect and replace constituents, which are disposed inside the casing 10, and the humidifying unit 30.

As described above, the panel 30 is installed to be exposed on the ceiling. Thus, the humidifying unit 30 and the casing 10, which are disposed above the panel 20, may be installed in a state of being embedded in an inner space of the ceiling. Here, the panel 20 may be provided to be wider in the radial direction than each of the humidifying unit 30 and the casing 10 so that the humidifying unit 30 and the casing 10 are not exposed to the outside.

Also, the casing 10, the humidifying body 31, and the panel 20 may have the same outer appearance. For example, each of the casing 10, the humidifying body 31, and the panel 20 may have a rectangular shape having approximately four sides.

Also, the casing 10 may have a rectangular column shape extending in the axial direction to define an inner space in which the plurality of components described above are provided. Also, the humidifying body 31 may extend in the axial direction to define a space in which a predetermined amount of humidifying water or fluid is accommodated.

As illustrated in FIG. 3, a humidifying suction hole corresponding to the suction hole 21 and a humidifying discharge hole 35 corresponding to the discharge hole 22 may be defined in the humidifying body 31. In detail, the humidifying suction hole 33 is defined in the central portion of the humidifying body 31, and the humidifying discharge hole 35 is defined outside the humidifying suction hole 33.

That is, the humidifying suction hole 33 is defined above the suction hole 21, and the humidifying discharge hole 35 is defined above the discharge hole 22. Thus, the suction hole and the humidifying suction hole 33 define an air suction passage extending in the axial direction, and the discharge hole 22 and the humidifying discharge hole 33 define an air discharge passage extending in the axial direction.

Referring to FIGS. 2 and 3, a flow of air in the air conditioner will be briefly described. When the fan motor 12 is driven to generate rotational force in the blowing fan 11, air in the indoor space flows upward in the axial direction through the suction hole 21 and the humidifying suction hole 33.

Also, a flow direction is changed while passing through the blowing fan 11. In detail, the air flowing upward in the axial direction flows outward from the blowing fan 11 in a radial radius. Thus, the air is heat-exchanged while passing through the heat exchanger 15.

Also, the air passing through the heat exchanger 15 flows downward in the axial direction along an inner wall of the casing 10. Also, the air is discharged to the inner space through the humidifying discharge hole 35 and the discharge hole 22.

That is, the air may be suctioned upward in the axial direction through the suction hole 21 and the humidifying suction hole 33, which are defined in the central portion, to flow outward in the radial direction from the inside of the casing 10 and then be discharged downward in the axial direction through the humidifying discharge hole 35 and the discharge hole 22.

Hereinafter, the humidifying unit 30 will be described in detail.

Figure 4:
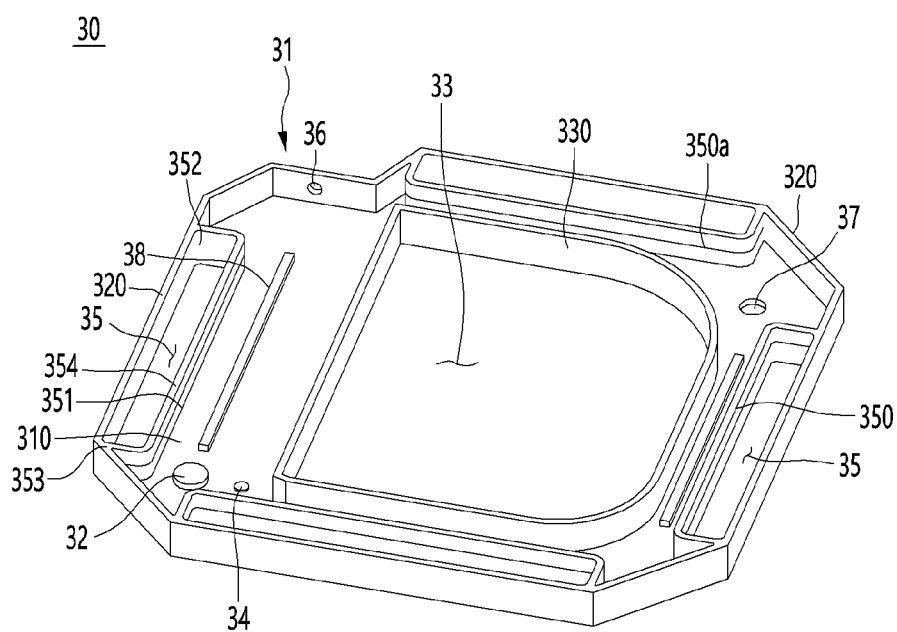
FIG. 4 is a view illustrating the humidifying unit of the ceiling type air conditioner according to an embodiment of the present invention.

FIG. 4 is a view illustrating the humidifying unit 30 of the ceiling type air conditioner according to an embodiment of the present invention.

As illustrated in FIG. 4, the humidifying unit 30 is provided with the humidifying body 31 that defines an accommodation space in which a predetermined amount of humidifying water or liquid is accommodated. Hereinafter, the humidifying body 31 may be provided in an integrated shape, but will be described separately for convenience of description.

The humidifying body 31 includes a bottom surface or plate 310, in which the humidifying suction hole 33 and the humidifying discharge hole 35 are defined, and an outer surface or wall 320 extending upward from an edge of the bottom surface 310.

The bottom surface 310 may be understood as a bottom surface in which the humidification water is accommodated. Also, the bottom surface 310 may be provided as a flat plate extending in the radial direction so that the humidifying water is stably accommodated. Also, the panel 20 is coupled to a lower portion of the bottom surface 310.

The outer surface 320 may be understood as a portion that defines an outer appearance of the humidifying body 31. Also, the casing 10 is coupled to an upper portion of the outer surface 320. That is, an axial length of the humidifying body 31 may be determined by the outer surface 320, and an amount of humidification water to be accommodated may be determined.

Also, the humidifying body 31 further includes a suction-side surface or wall 330 extending upward from an edge of the humidifying suction hole 33 and a discharge-side surface or wall 350 extending upward from an edge of the humidifying discharge hole 35.

The suction-side surface 330 and the discharge-side surface 350 may extend to the same length or height as the outer surface 320. That is, the casing 10 may be coupled to upper portions of the outer surface 320, the suction-side surface 330, and the discharge-side surface 350.

At this time, the discharge-side surface 350 may be coupled to the outer surface 320, and the suction-side surface 330 may be spaced apart from the outer surface 320. This is due to the positions of the humidifying suction hole 33 and the humidifying discharge hole 35.

In detail, the suction-side surface 330 is disposed on the central portion of the humidifying body 31 to correspond to the humidifying suction hole 33. Also, the suction-side surface 330 is provided to form one circle.

The discharge-side surface 350 is provided in plurality to correspond to the humidification discharge hole 35. For example, four discharge-side surfaces 350 may be respectively provided in the four surfaces to correspond to the humidifying discharge hole 35.

The discharge-side surface 350 includes a lower end 351 coupled to the bottom surface 310, first and second side ends or surfaces 352 and 353 extending from both ends of the lower end 351 in a first direction, and an upper end 354 extending in a second direction to connect the first and second side ends 352 and 353 to each other.

Here, the first direction may be understood as the axial direction, and the second direction may be understood as the radial direction. That is, the discharge-side surface 350 corresponds to a quadrangular shape with the lower end 351, the first and second side ends 352 and 353, and the upper end 354 as edges.

Also, the first and second side ends 352 and 353 are respectively coupled to the outer surface 320. Thus, a portion of the outer surface 320 and the discharge-side surface 350 may provide a passage of air flowing to the humidifying discharge hole 35. In FIG. 4, for example, the discharge-side surface 350 is bent in an approximately '⊏' shape at a portion of the outer surface 320 extending in a straight line.

Also, at least one humidifying hole or slit 350*a* is defined in the discharge-side surface 350. This will be described later in detail in FIG. 5.

Also, the humidifying unit 30 includes a vibrator or sound emitter 32 disposed inside the humidifying body 31 to convert the humidifying water into the fine particles or droplets. The vibrator 32 may generate the fine particles or droplets by providing vibration to a predetermined working fluid.

For example, the vibrator 32 may emit a predetermined sound wave to generate fine particles on a liquid surface of the working fluid. Also, an amount of generated fine particles may vary according to an intensity of the sound wave emitted from the vibrator 32. The vibrator 32 may alternatively be referred to as an acoustic emitter or transmitter.

The vibrator 32 may be installed on the bottom surface 310 to convert the accommodated humidifying water into fine particles. Also, the vibrator 32 may be provided in plurality and may be variously disposed within the humidifying body 31.

Also, the humidifying unit 30 further includes a water level sensor 34 that measures a water level of the humidifying water accommodated in the humidifying body 31. The water level sensor 34 may be provided in plurality and installed at various positions within the humidifying body 31. Also, it is possible to determine installation failures through a water level difference measured by the plurality of water level sensors 34.

Also, the humidifying unit 30 further includes a water supply pipe 360 (see FIG. 7) that supplies the humidifying water to the humidifying body 21. The water supply pipe 360 may be installed in a water supply hole 36 defined in the outer surface 320 to supply the humidifying water to the humidification body 21. Here, the water supply hole 36 may be defined at a predetermined height to supply the humidifying water to the humidifying body 21 at a predetermined height.

Also, the humidifying unit 30 further includes a drain pipe 370 (see FIG. 7) that discharges the humidifying water accommodated in the humidifying body 31 to the outside. The drain pipe 370 may be installed in the drain hole 37 defined in the bottom surface 310 to remove the humidifying water accommodated in the humidifying body 31.

Here, the bottom surface 310 may be provided to have a predetermined inclination around the drain hole 37. Thus, the humidifying water accommodated in the humidifying body 31 may be smoothly discharged through the drain hole 37.

Also, the humidifying unit 30 further includes an ultraviolet (UV) lamp 38 that sterilizes the humidifying water. The UV lamp 38 may be provided in plurality and installed on the bottom surface 310. For example, the UV lamp 38 may irradiate ultraviolet light having predetermined energy to remove contamination of the humidifying water.

Figure 5:
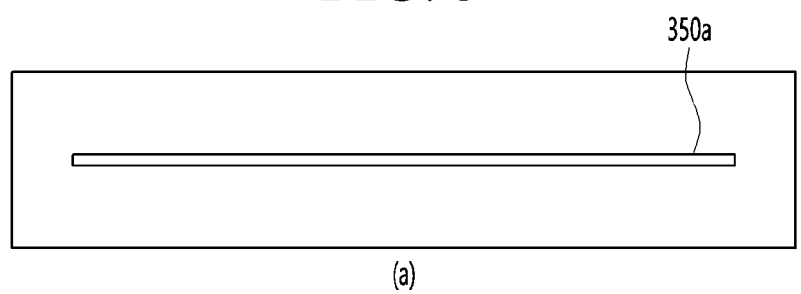
FIG. 5 is a view illustrating a discharge-side surface of the ceiling type air conditioner according to an embodiment of the present invention.
Figure 5:
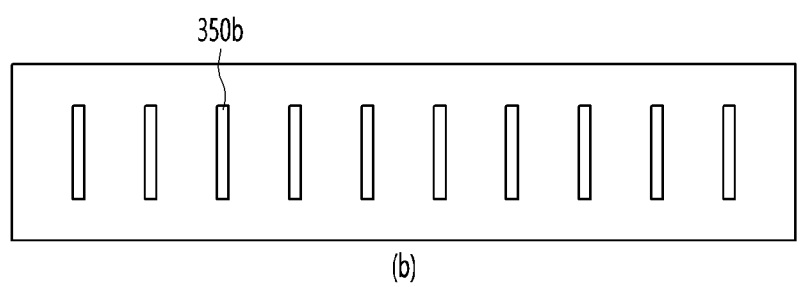
Figure 5:
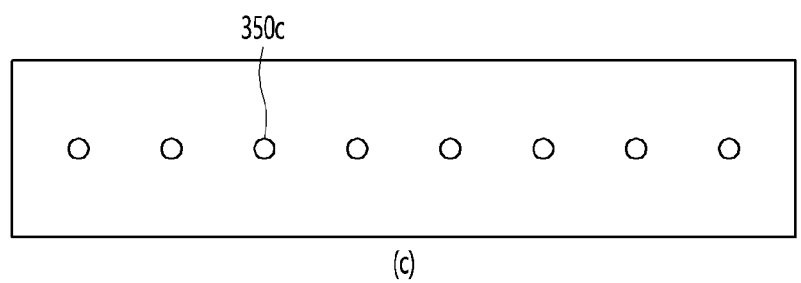

FIG. 5 is a view illustrating the discharge-side surface of the ceiling type air conditioner according to an embodiment of the present invention.

As described above, at least one humidifying hole or slit 350*a* is defined in the discharge-side surface 350. The humidifying hole 350*a* may be understood as a predetermined opening that is cut to pass through the discharge-side surface 350.

However, the humidifying hole 350*a* corresponds to a small sized opening through which the fine particles generated by the vibrator 32 pass. Particularly, the vibrator 32 may have a size that does not allow water particles to pass therethrough. For example, the humidifying hole 350*a* corresponds to a predetermined slit or a slit having a predetermined size and/or shape.

FIG. 5 illustrates a humidifying hole 350*a* having various shapes.

As illustrated in view (a) of FIG. 5, the humidifying hole 350*a* may be defined to extend in the second direction, i.e., in the radial direction along the discharge-side surface 350. Also, as illustrated in view (b) of FIG. 5, a humidifying hole 350*b* may be defined to extend in the first direction, i.e., in the axial direction along the discharge-side surface 350. Also, as illustrated in view (c) of FIG. 5, a humidifying hole 350*c* may be provided as a circular opening.

Also, the humidifying holes 350*b* and 350*c* illustrated in views (b) and (c) of FIG. 5 may be defined in plurality, which are spaced apart from each other in the second direction. As described above, the humidifying holes 350(*a*), (*b*) and/or (*c*) may have various shapes, and the shape of the humidifying hole 350*a* is not limited thereto. Hereinafter, the fine particles flowing through the humidifying hole 350*a* will be described.

Figure 6:
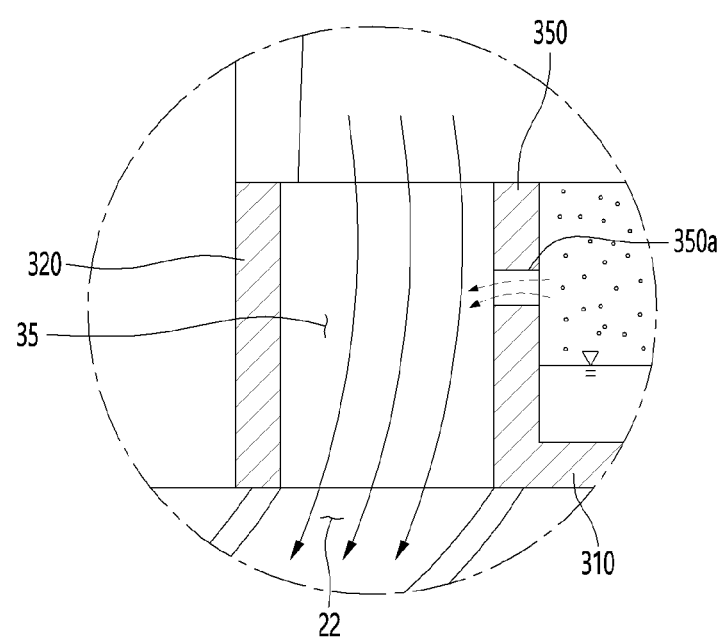
FIG. 6 is a view illustrating a flow of air and fine particles or droplets at a portion A of FIG. 2.

FIG. 6 is a view illustrating a flow of the air and the fine particles at a portion A of FIG. 2.

As illustrated in FIG. 6, predetermined humidifying water is accommodated in the humidifying body 31, and fine particles are generated on the surface of the humidifying water by the vibrator 32. That is, the humidifying body 31 accommodates the fine particles generated by the vibrator 32.

Also, as described above, the air discharged from the casing 10 flows downward in the axial direction to pass through the humidifying discharge hole 35 and the discharge hole 22. According to the flow of the air, the fine particles may pass through the humidifying hole 350*a* to flow to the humidifying discharge hole 35.

In detail, a negative pressure is generated according to the flow of the air so that the fine particles flow toward the air. Due to this structure, the humidifying unit 30 may humidify the discharge air without a separate power device. That is, the fine particles may flow by the flow of the air generated by the blowing fan 11.

Figure 7:
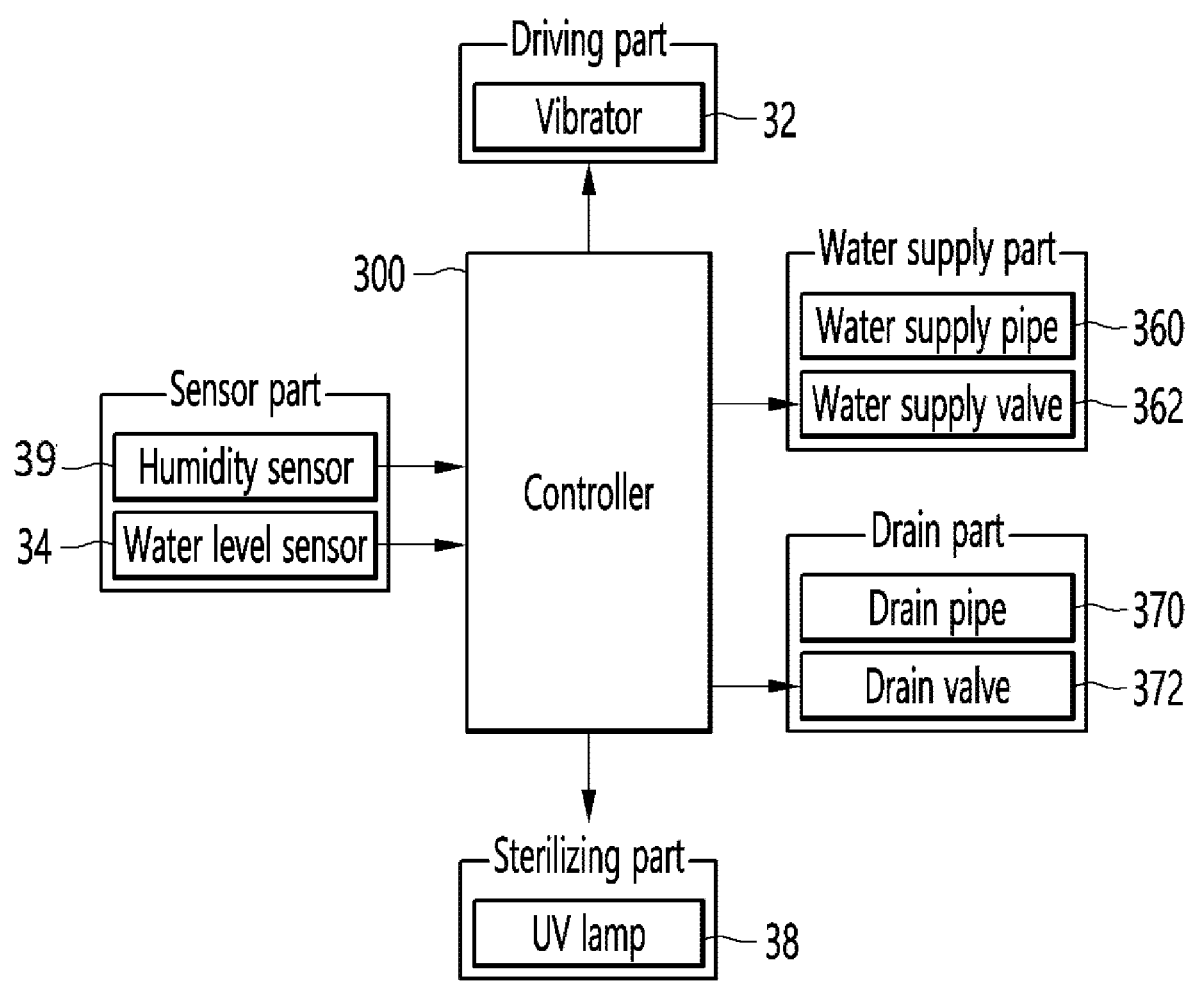
FIG. 7 is a view illustrating a control configuration of the ceiling type air conditioner according to an embodiment of the present invention.

FIG. 7 is a view illustrating a control configuration of the ceiling type air conditioner according to an embodiment of the present invention.

As illustrated in FIG. 7, the air conditioner includes a controller 300. Also, the controller 300 corresponds to the same configuration as the above-described control unit 90 for controlling the blowing fan 11 and the like. Hereinafter, for convenience of explanation, only the control configuration of the humidifying unit 30 is illustrated.

The humidifying unit 30 may be largely divided into a sensor part or assembly, a driving part or assembly, a water supply part or assembly, a drain part or assembly, and a sterilizing part or assembly. FIG. 7 illustrates only a schematic configuration, and various configurations may be further provided.

The vibrator 32 is provided in the driving part, and the UV lamp 38 is provided in the sterilizing part.

In addition, the water level sensor 34 and a humidity sensor 39 are included in the sensor part. The humidity sensor 39 may be disposed to measure humidity of the indoor space. For example, the humidity sensor 39 may be installed adjacent to the suction hole 21 or may be installed in the indoor space.

Also, the water supply part includes a water supply pipe 360 and a water supply valve 362 that opens and closes the water supply pipe 360. Particularly, the water supply valve 362 may open and close the water supply pipe 360 according to the water level measured by the water level sensor 34.

Also, the drain part includes a drain pipe 370 and a drain valve 372 that opens and closes the drain pipe 370.

Figure 8:
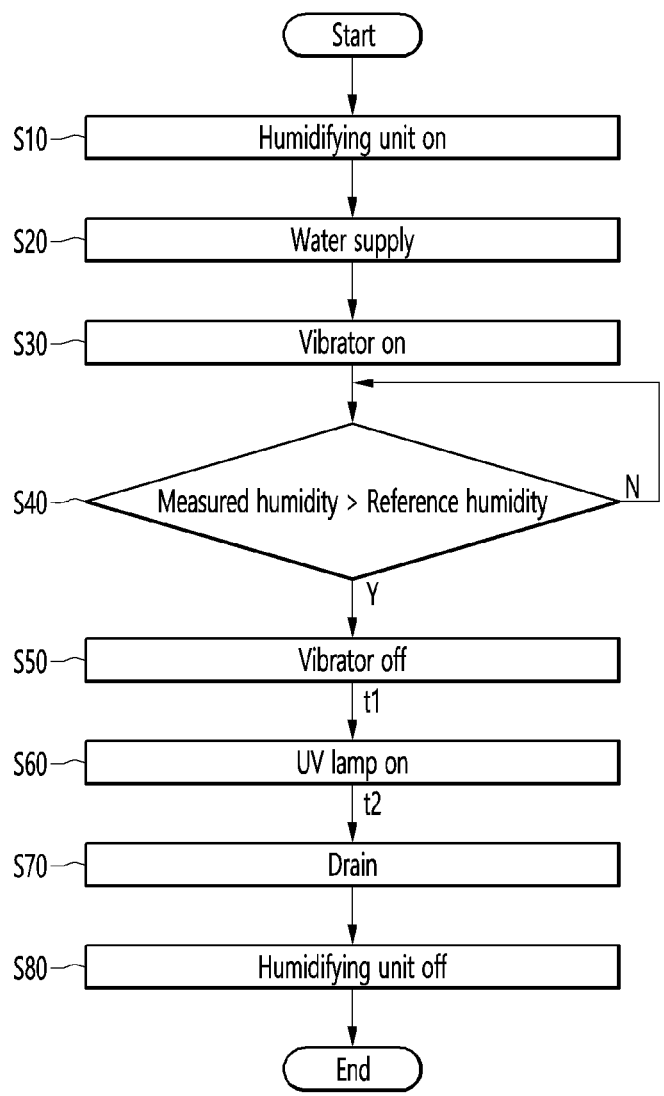
FIG. 8 is a view illustrating a control flow of the ceiling type air conditioner according to an embodiment of the present invention.

FIG. 8 is a view illustrating a control flow of the ceiling type air conditioner according to an embodiment of the present invention.

As illustrated in FIG. 8, the humidifying unit 30 is turned on (S10). Here, it is assumed that the air conditioner is turned on to allow the blowing fan 11 to operate. Also, the blowing fan 11 may operate according to the turn-on of the humidifying unit 30.

In detail, when the humidity measured by the humidity sensor 39 is equal to or less than a reference humidity, the humidifying unit 30 may be turned on. For example, when the reference humidity is 40%, if an indoor humidity measured by the humidity sensor 39 is 35%, the humidifying unit 30 is turned on.

Also, the humidifying unit 30 may be turned on according to a user's selection. Also, the reference humidity may be set to a humidity at which the user feels comfortable according to the temperature and may be set differently according to the user's setting.

When the humidifying unit 30 is turned on, the water supply valve 362 is opened, and a predetermined amount of humidifying water is accommodated in the humidifying body 31 (S20). Water supply may be continued until the water level sensor 34 detects that the humidifying water above the reference level is accommodated.

Also, in the turn-on state of the humidifying unit 30, it is possible to maintain a state in which the predetermined amount of humidifying water is accommodated in the humidifying body 31. That is, the water supply valve 362 may open and close the water supply pipe 360 so that the reference water level is maintained.

When the predetermined amount of humidifying water of the humidifying body 31 is accommodated, the vibrator 32 is turned on (S30). Thus, the fine particles are generated by the vibrator 32, and the fine particles flow along the flow of the air by the blowing fan 11. Thus, the discharged air may be humidified.

Also, when the humidity measured by the humidity sensor 360 is greater than the reference humidity (S40), the vibrator 32 is turned off (S50). Also, if the user does not require the humidification, the vibrator 32 may be turned off. Here, the humidifying body 31 is in a state in which the predetermined humidification water is accommodated.

Also, the vibrator 32 is turned off, and after a predetermined time t1, the UV lamp 38 is turned on to sterilize the accommodated humidifying water (S60). For example, when 30 minutes elapses after the vibrator 32 is turned off, the UV lamp 38 may be set to operate. Also, a reference of a time for which the UV lamp 38 is turned on may be after the predetermined amount of humidification water is accommodated in the humidifying body 31.

Also, after the vibrator 32 is turned off, and a predetermined time t2 elapses, the drain valve 372 opens the drain pipe 270 (S70). Also, when it is determined that all of the humidifying water accommodated in the humidifying body 31 is discharged, the humidifying unit 30 is turned off.

Due to this process, it is possible to prevent the contamination and odor of the humidifying water accommodated in the humidifying body 31 from occurring.

The invention claimed is:

1. An air conditioner, comprising:
a casing;
a drain pan coupled to a bottom of the casing;
a heat exchanger placed on the drain pan;
a fan provided inside of the casing and surrounded by the heat exchanger to suction air and discharge the air passing through the heat exchanger;
a panel having a suction hole and a plurality of discharge holes, the plurality of discharge holes being formed in edges of the panel and outwardly spaced apart from the suction hole; and
a humidifier that converts humidifying water into droplets, the humidifier including:
   a tray provided between the drain pan and the panel to store the humidifying water; and
   a single sound emitter provided inside of the tray to convert the humidifying water into thevapor droplets, wherein the tray includes:
      a humidifying suction hole configured to align with the suction hole;
      a plurality of humidifying discharge holes configured to align with the plurality of discharge holes, respectively;
      an outer wall that extends from an outer edge of the tray, a portion of the outer wall being configured to extend from an outer edge of each of the plurality of humidifying discharge holes;
      a first inner wall that extends upwardly from an edge of the humidifying suction hole; and
      a plurality of second inner walls, each of the plurality of second inner walls being configured to extend upwardly from inner three edges of each of the plurality of humidifying discharge holes, wherein a space that accommodates the humidifying water is formed between the outer wall and the plurality of second inner walls and the first inner wall, wherein an opening is formed in each of the plurality of second inner walls to provide communication between the space and the plurality of humidifying discharge holes to allow the droplets produced by the sound emitter to flow from the space to the plurality of discharge holes, and wherein the single sound emitter is disposed on a bottom of the space and the vapor droplets generated by the sound emitter are discharged through all of the openings and the plurality of discharge holes.

2. The air conditioner according to claim 1, wherein the humidifier further comprises:
a supply pipe configured to supply the humidifying water to the tray;
a fluid level sensor configured to measure a level of the humidifying water in the tray; and
a supply valve configured to open or close the supply pipe according to the level measured by the fluid level sensor.

3. The air conditioner according to claim 1, wherein the humidifier further comprises:
   a drain pipe through which the humidifying water in the tray is discharged; and
   a drain valve configured to open or close the drain pipe.

4. The conditioner according to claim 1, wherein the humidifier further comprises an ultraviolet (UV) lamp provided on the tray to sterilize the humidifying water.

5. The air conditioner according to claim 4, wherein, when the humidifying water is contained in the tray for a predetermined amount of time, the UV lamp is configured to operate to sterilize the humidifying water.

6. The air conditioner of claim 1, wherein the casing is configured to be installed in a ceiling such that the panel is exposed to a space to be air conditioned.

7. The air conditioner according to claim 1, wherein each of the plurality of second inner walls comprises:
   a first wall that faces the first inner wall; and
   second walls that extend at both ends of the first wall and perpendicular to the first wall, the second walls being shorter than the first wall in a lateral direction, wherein the opening is formed in the first wall.

8. The air conditioner according to claim 7, wherein the opening is one among a plurality of small circular holes arranged along the first wall, a slit that horizontally extends along the first wall, or a plurality of short slits that extend vertically and arranged along the first wall.

* * * * *